United States Patent
Yokokura

(10) Patent No.: US 8,453,230 B2
(45) Date of Patent: May 28, 2013

(54) COMMUNICATING APPARATUS FOR PERFORMING COMMUNICATION OVER IP NETWORK BY USING SIP, CONTROLLING METHOD THEREFOR, AND PROGRAM

(75) Inventor: Hidenori Yokokura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 33 days.

(21) Appl. No.: 13/175,389

(22) Filed: Jul. 1, 2011

(65) Prior Publication Data

US 2012/0005744 A1    Jan. 5, 2012

(30) Foreign Application Priority Data

Jul. 2, 2010    (JP) .................................. 2010-151991

(51) Int. Cl.
*G06F 9/00*    (2006.01)
(52) U.S. Cl.
USPC ........................................................ 726/14
(58) Field of Classification Search
USPC .................. 726/11–14; 713/153; 709/230
See application file for complete search history.

(56) References Cited

U.S. PATENT DOCUMENTS

2005/0132060 A1* 6/2005 Mo et al. ........................ 709/227
2010/0070972 A1* 3/2010 Kumagai et al. .................. 718/1
2010/0299418 A1* 11/2010 Bhat .............................. 709/221

FOREIGN PATENT DOCUMENTS

JP          4080169 B2    2/2008
JP       2008048198 A *   2/2008

* cited by examiner

*Primary Examiner* — Samson Lemma
(74) *Attorney, Agent, or Firm* — Rossi, Kimms & McDowell LLP

(57) ABSTRACT

A communicating apparatus that is able to perform IP-FAX communication without making the user aware of the attack and without any difficulty, even if the device recognizes a DoS attack or the like. communication that uses a SIP server on a network is performed by a communicating unit. Unauthorized communication from the communication performed by the communicating unit is detected. A port number of a receiving port of the communicating unit is changed when the unauthorized communication is detected. it is determined whether or not the detected unauthorized communication has passed through the SIP server. The communicating apparatus is controlled to request the SIP server to delete the port number of the receiving port that has not been changed yet if it is determined that the unauthorized communication has passed through the SIP server and to re-register on the SIP server a port number of a receiving port that has been changed if it is determined that the unauthorized communication has bypassed the SIP server.

9 Claims, 6 Drawing Sheets

COMMUNICATING APPARATUS FOR PERFORMING COMMUNICATION OVER IP NETWORK BY USING SIP, CONTROLLING METHOD THEREFOR, AND PROGRAM

BACKGROUND OF THE INVENTION

1. Field of the Invention

The present invention relates to a communicating apparatus for performing communication over an IP (Internet Protocol) network by using an SIP (Session Initiation Protocol), a controlling method therefor, and a program.

2. Description of the Related Art

In recent years, infrastructure of a next-generation network such as the NGN (Next Generation Network) is being established, and accordingly ways of communication are being shifted from analog networks to IP networks. In such circumstances, IP-FAX communication that is carried out via an intranet under the same scheme as that of the FAX communication has started and it is anticipated that the IP-FAX communication is going to be in increasing demand.

In addition, for SIP (Session Initiation Protocol) communication, there is a system developed for improving the communication between two terminals in the case where firewall software is respectively installed in routers of the two terminals (for example, see Japanese Patent No. 4080169).

Meanwhile, in the network field, measures to achieve improved security against vulnerabilities of communication systems are urgently necessary, and the same is also true of the IP-FAX. For example, as part of the security measures, in order to avoid IP-FAX incoming from a device having some problem, there is a technique for blocking the communication from a particular device by blocking incoming from a telephone number and incoming from a domain other than a specified domain and by filtering a specified IP address.

However, in the security measures such as the IP filtering used by the conventional IP-FAX, each time an IP address or the like of the particular device is changed, the settings need to be reset. In addition, it is difficult to block the communication from the particular device perfectly, because resources for setting the filters are limited. Consequently, a device may be subject to a DoS (Denial of Service) attack, a DDoS (Distributed Denial of Service) attack, and the like.

SUMMARY OF THE INVENTION

The present invention has been made in view of the above described problems and provides a communicating apparatus that is able to perform IP-FAX communication without making the user aware of the attack and without any difficulty, a controlling method therefor, and a program, even if the apparatus recognizes a DoS attack or the like.

In a first aspect of the present invention, there is provided a communicating apparatus comprising a communicating unit configured to perform communication that uses a SIP server on a network, a detecting unit configured to detect unauthorized communication from the communication performed by the communicating unit, a changing unit configured to change a port number of a receiving port of the communicating unit when the detecting unit detects the unauthorized communication, a determining unit configured to determine whether or not the unauthorized communication detected by the detecting unit has passed through the SIP server, and a controlling unit configured to control the communicating apparatus to request the SIP server to delete the port number of the receiving port that has not been changed yet by the changing unit if the determining unit determines that the unauthorized communication has passed through the SIP server and to re-register on the SIP server a port number of a receiving port that has been changed by the changing unit if the determining unit determines that the unauthorized communication has bypassed the SIP server.

According to the present invention, even if a device that uses the IP-FAX communication recognizes a DoS attack, a DDoS attack, or the like, the IP-FAX communication can be performed without making the user aware of the attack and without any difficulty.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
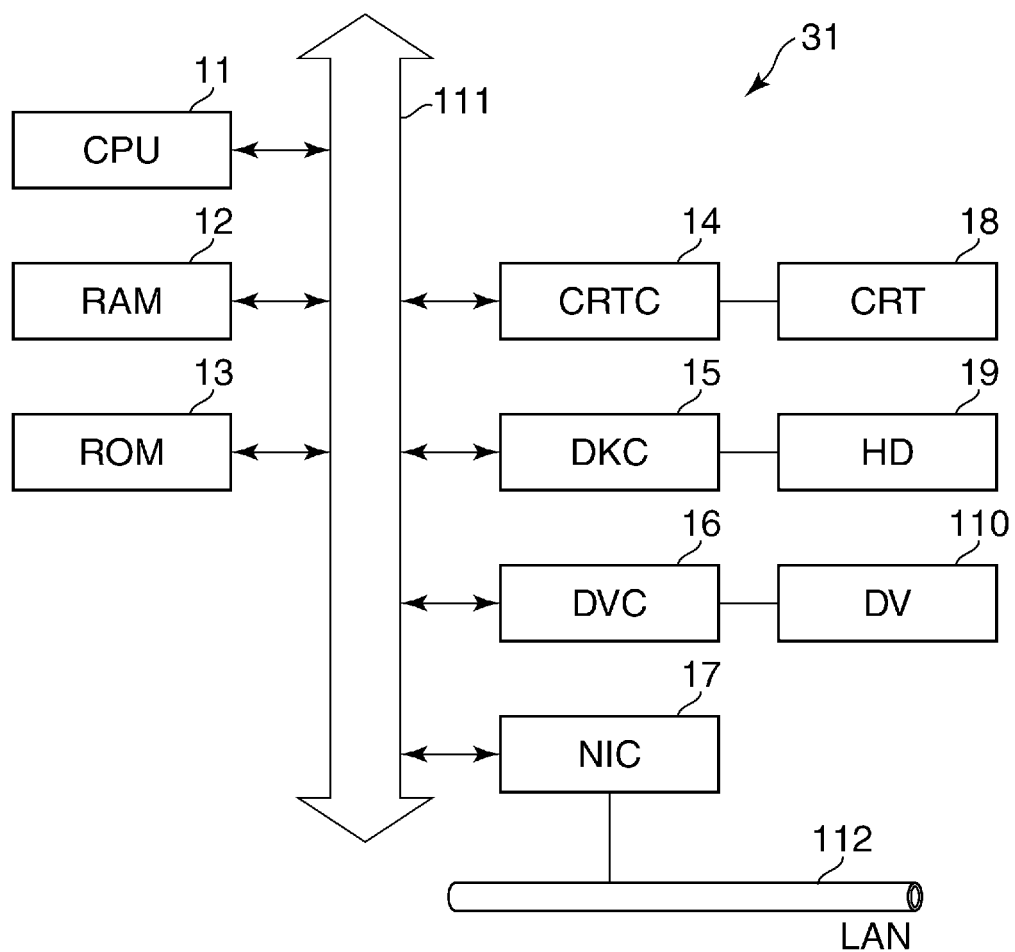
FIG. 1 is a diagram showing an internal configuration of a device that is an example of a communicating apparatus according to an embodiment of the present invention.

FIG. 1 is a diagram showing an internal configuration of a device that is an example of a communicating apparatus according to an embodiment of the present invention.

The communicating apparatus according to the embodiment is, for example, a device 31 including a fax device in which a network controller and a device (printer) controller are operated by a single CPU.

The device 31 includes a CPU 11 to execute a program stored in a ROM 13. The CPU 11 collectively controls devices connected with a system bus 111. A RAM 12 functions as a main memory, a work area, and the like of the CPU 11. Also, the RAM 12 functions as a backup RAM for storing a communication port setting value for the SIP. It should be noted that the communication port setting value may also be stored not in the backup RAM but in another storage device such as an HD 19 described later.

A CRT controller (CRTC) 14 controls display of a CRT display (CRT) 18. A user can see a setting of the IP-FAX and an error indication through the CRT 18. A disk controller (DKC) 15 controls the hard disk (HD) 19 for storing image data and various user data. A device controller (DVC) 16 controls a device unit (DV) 110. The DV 110 includes a printer unit and a scanner unit, for example.

A network interface card (NIC) 17 functions as a communicating unit to communicate (e.g., performing IP-FAX communication) with another network device and a PC on a network via a LAN 112 by using a predetermined communication protocol.

It should be noted that although a keyboard is not shown in FIG. 1, of course a keyboard may also be included. In addition, the HD 19 is not necessarily included and a USB memory or the like may be adopted in place of the HD 19 as long as the substitute can store data.

Figure 2:
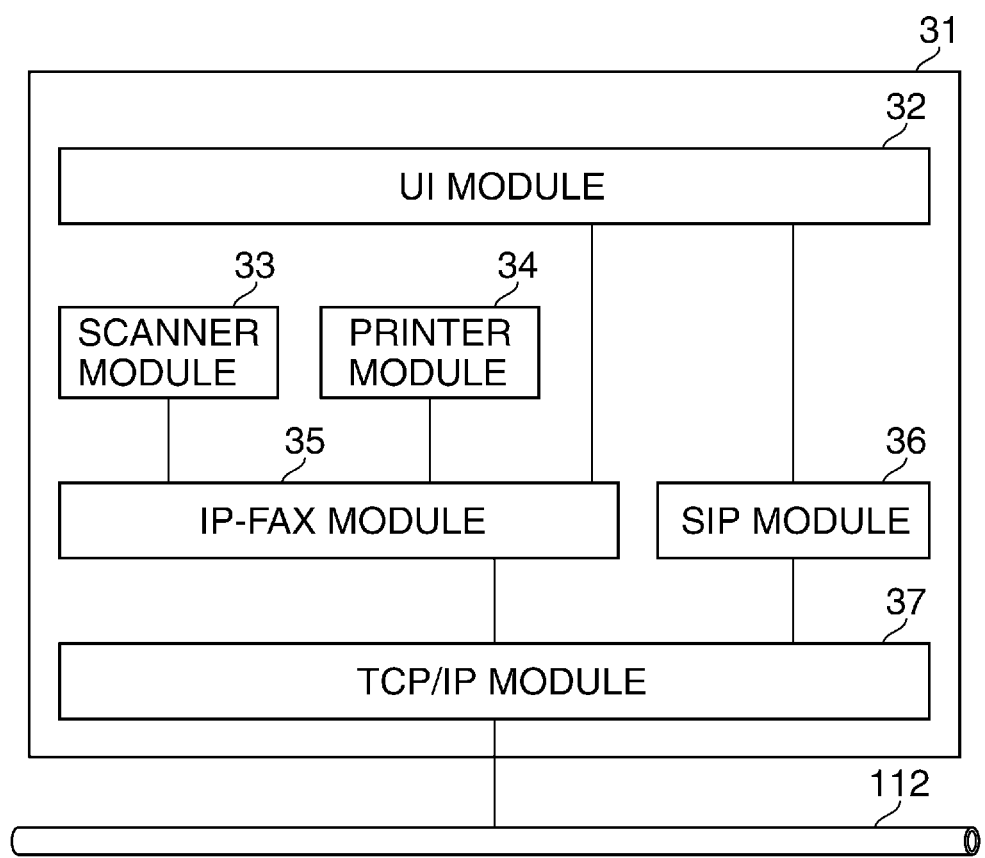
FIG. 2 is a diagram showing an example of a configuration of internal modules in the device shown in FIG. 1.

FIG. 2 is a diagram showing an example of a configuration of internal modules in the device 31 shown in FIG. 1.

In FIG. 2, the device 31 includes a UI module 32, a scanner module 33, a printer module 34, an IP-FAX module 35, a SIP module 36, and a TCP/IP module 37.

The UI module 32 is a module for displaying an image on the CRT 18. The scanner module 33 is a module for controlling the scanner unit of the DV 110. The printer module 34 is a module for controlling the printer unit of the DV 110. The IP-FAX module 35 is a module for performing an IP-FAX communication procedure. The SIP module 36 is a module for managing a SIP protocol. The TCP/IP module 37 is a TCP/IP protocol stack module.

It should be noted that in this embodiment, since the IP-FAX communication is taken as an example, the scanner module 33 and the printer module 34 are included, but the scanner module 33 and the printer module 34 are not necessarily needed for IP communication other than the IP-FAX communication.

Figures 3, 4:
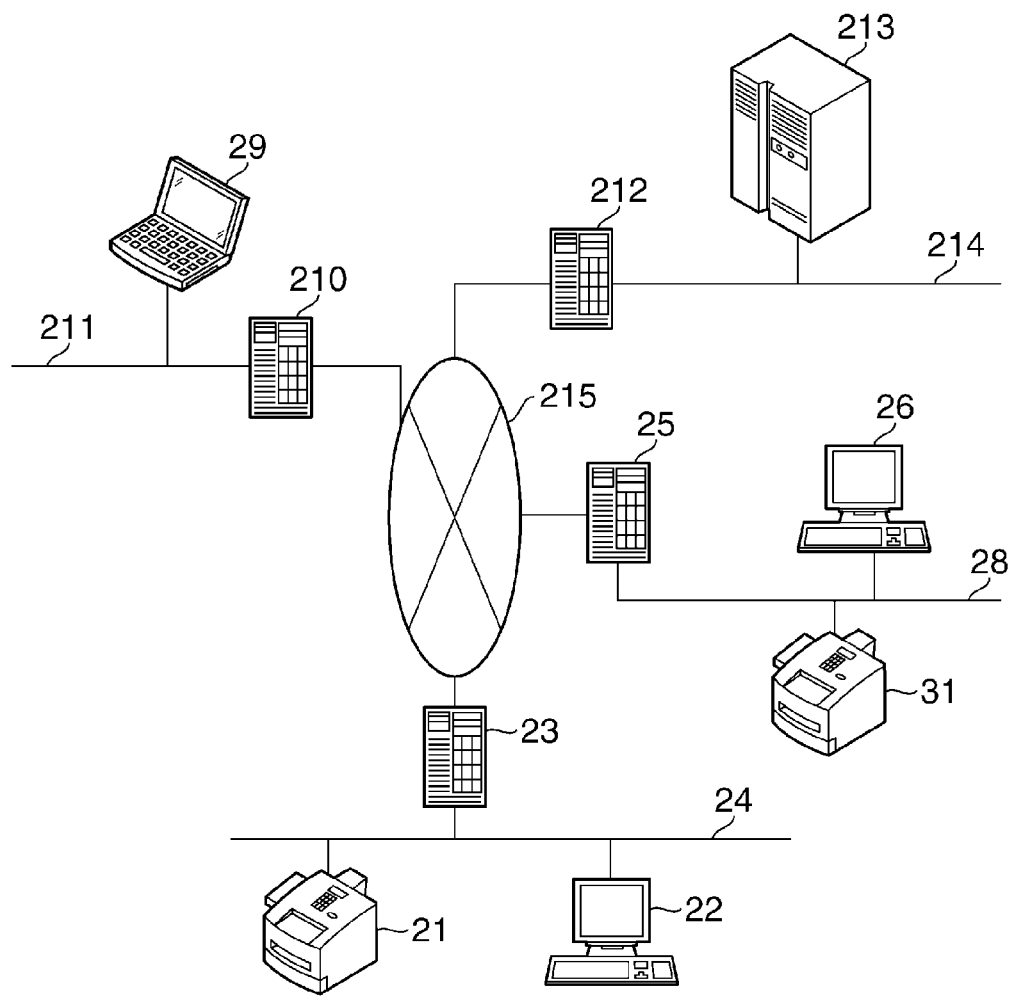
FIG. 3 is a drawing showing an example of an overall configuration of a communication system including the device shown in FIG. 1.
FIG. 4 is an example of table information constituted by a normal port number registered for the IP-FAX in the device shown in FIG. 1 and a backup port number to be used in place of the normal port number when the device recognizes a DoS attack.

FIG. 3 is a drawing showing an example of an overall configuration of a communication system including the device 31 shown in FIG. 1.

In FIG. 3, the device 21 is a device having the same configuration as that of the device 31 shown in FIG. 1 and FIG. 2, the device performing the IP-FAX communication. The PCs 22 and 26 are personal computers (PCs) that function as information processing apparatuses. The PCs 22 and 26 can issue a printing command and perform status monitoring with respect to the devices 21 and 31.

LANs 24, 28, 211, and 214 are local area networks (LANs). Proxy servers 23, 25, 210, and 212 are proxy servers for providing Internet connection and they are connected with the Internet 215. A PC 29 is a PC for launching a DoS attack described later. A SIP server 213 is a server for controlling voice and data communication of an IP telephone and the IP-FAX by using a SIP protocol.

It should be noted that in the description of the embodiment, an environment is assumed to be the Internet, but the environment is not limited thereto, and also the proxy servers are not indispensable. In addition, the numbers of the devices and the PCs are not limited to the shown example. Furthermore, in the embodiment, a case including a device for performing the IP-FAX communication is taken as an example, but the device is not limited to a device for performing the IP-FAX communication as long as the device performs the SIP communication.

In addition, the embodiment includes a single PC that launches an attack, but the number of the PCs is not limited to one. For example, a DDoS attack is usually launched by a plurality of PCs, so that a plurality of PCs may also be connected with the Internet.

FIG. 4 is an example of table information constituted by a normal port number registered for the IP-FAX in the device 31 shown in FIG. 1 and a backup port number to be used in place of the normal port number when the device recognizes a DoS attack.

The table information shown in FIG. 4 is information stored in the RAM 12 or the HD 19 as communication port setting values of the device 31. A table 41 for storing a normal port number stores a controlling port number "5001" registered (REGISTER) on the SIP server 213 by default. A table 42 for storing a backup port number stores a controlling port number "5011" to be used when the device 31 determines that the normal port number cannot be used.

It should be noted that the description of the embodiment includes the port numbers of the controlling ports of the device 31, the numbers being registered on the SIP server 213, but as long as the port can be registered on the SIP server 213, any type of port number such as the numbers of a data port and an RTP port of the device 31 may be described in the table information shown in FIG. 4.

DoS attacks from the PC 29 to the device 31 in the communication system shown in FIG. 3, one of which bypasses the SIP server 213 and the other one of which passes through the SIP server 213, are now described.

Figure 5:
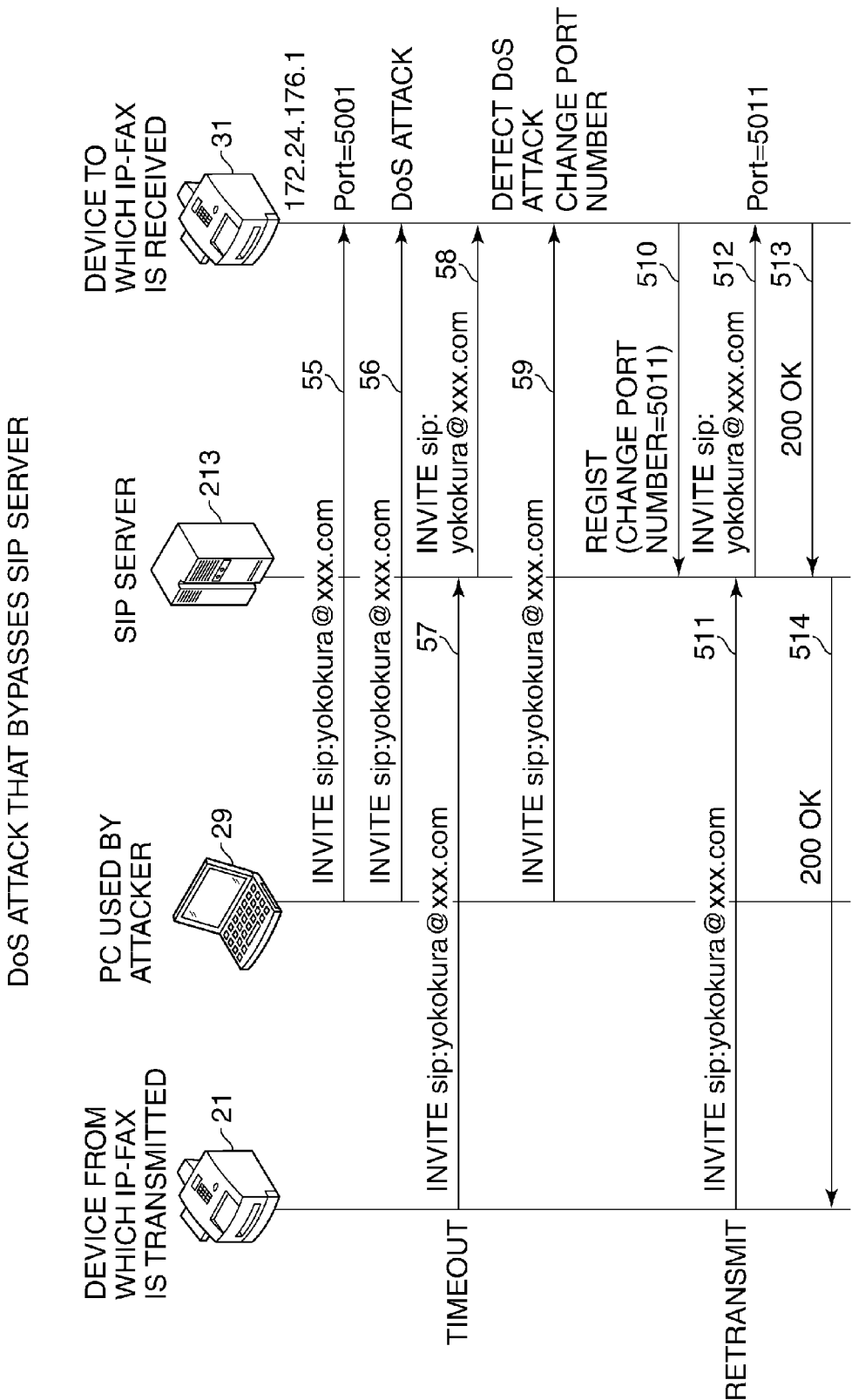
FIG. 5 is an example of a sequence of communication performed between devices when a DoS attack from a PC to the device bypasses a SIP server.

FIG. 5 is an example of a sequence of communication performed between devices when a DoS attack from the PC 29 to the device 31 bypasses the SIP server 213.

The device 21 from which IP-FAX is to be transmitted can communicate with the device 31 at which IP-FAX is to be received via the SIP server 213. This communication is implemented by sending an INVITE request 57 of the SIP protocol from the device 21 to the SIP server 213 and then sending an INVITE request 58 from the SIP server 213 to the device 31.

Meanwhile, the PC 29, which is an SIP terminal used by an attacker, launches a DoS attack by sending packets of INVITE requests 55, 56, and 59 directly (without passing through the SIP server 213) and continuously to the device 31.

The device 31 that has received the INVITE request 59 detects the DoS attack and identifies the IP address of a device sending the INVITE request 59, thereby determining that the detected Dos attack bypassed the SIP server 213. Then, the device 31 changes a port number of a controlling port of the device 31 and makes a REGISTER request 510 to the SIP server 213 in order to change a setting value registered as the port number of the controlling port of the device 31. In this case, the setting value registered on the SIP server 213 is changed from "5001" which is the normal port number shown in FIGS. 4 to "5011" which is the backup port number.

After the device 21 sends the INVITE request 57, if the device 21 has not been able to communicate with the device 31 because of timeout, the device 21 performs a usual retransmission of the SIP-FAX. That is, the device 21 makes an INVITE request 511, which is the same request as the INVITE request 57, again via the SIP server 213. However, in this instance, since the port number of the controlling port of the device 31 has been changed, the SIP server 213 makes an INVITE request 512 to the device 31 with the port number "5011" which is the changed number. Notifications 513 and 514 represent "200 OK" which denotes that the connection is established. The notification 513 is sent from the device 31 to the SIP server 213 and the notification 514 is sent from the SIP server 213 to the device 21, and thereafter data transferring of the IP-FAX is performed between the device 21 and the device 31.

It should be noted that in the embodiment, the port number of the controlling port of the device 31, the number being registered on the SIP server 213, is changed to avoid a DoS attack, but the port number to be changed is not limited to this, and the port number of the data port or the RTP port of the device 31 may also be changed. In addition, the number of packets of a DoS attack is not limited to the shown example, but any number is possible.

As a way to detect a DoS attack in the device 31, packet load may be used as well as an error of packet information (malformed packet) may also be used for determination. In addition, the similar control can be applied to not only a DoS attack but also a DDoS attack from a plurality of terminals. It should be noted that the IP address of the PC 29, which is identified by the device 31, is not limited and may be an IPv4 address as well as an IPv6 address.

Figure 6:
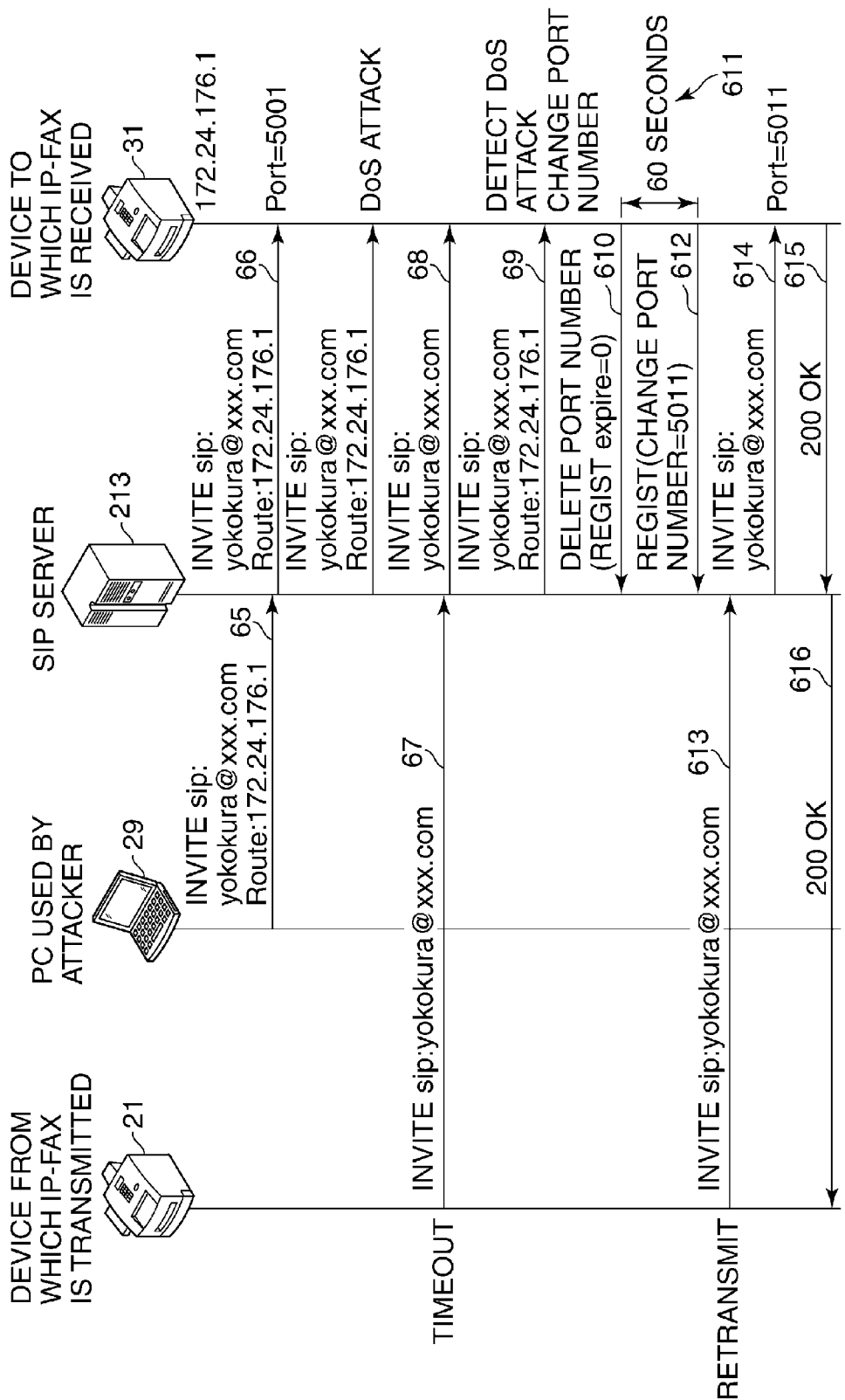
FIG. 6 is an example of a sequence of communication performed between devices when a DoS attack from a PC to the device passes through a SIP server.

FIG. 6 is an example of a sequence of communication performed between devices when a DoS attack from the PC 29 to the device 31 passes through the SIP server 213.

The device 21 from which IP-FAX is to be transmitted can communicate with the device 31 at which IP-FAX is to be received via the SIP server 213. This communication is implemented by sending an INVITE request 67 of the SIP protocol from the device 21 to the SIP server 213 and then sending an INVITE request 68 from the SIP server 213 to the device 31.

Meanwhile, the PC 29, which is an SIP terminal used by an attacker, requests the SIP server 213 to send an INVITE request 65 via the device having an IP address of "172.24.176.1."

The SIP server 213 receives the request from the PC 29 to launch a DoS attack by sending packets of INVITE requests 66 and 69 indirectly (via the SIP server 213) and continuously to the device 31. The device 31 that has received the INVITE request 69 detects the DoS attack and identifies the IP address of a device sending the INVITE request 69, thereby determining that detected Dos attack passed through the SIP server 213. Then, the device 31 changes a port number of the controlling port of the device 31 and makes a deleting request 610 to the SIP server 213 to delete a setting value registered as the port number of the controlling port of the device 31, namely, a request to let "REGIST expire=0." Then, the device 31 starts timer counting 611 for re-registering a port number. In the embodiment, the device 31 internally counts to 60 seconds as the timer counting 611.

Next, the device 31 makes a REGISTER request 612 to the SIP server 213 in order to change the setting value registered as the port number of the controlling port of the device 31. In this instance, the setting value registered on the SIP server 213 is changed from "5001", which is the normal port number shown in FIGS. 4, to "0" by the above described deleting request 610, and thereafter the value is changed to "5011", which is the backup port number.

After the device 21 sends the INVITE request 67, if the device 21 has not been able to communicate with the device 31 because of the timeout, the device 21 performs a usual retransmission of the SIP-FAX. That is, the device 21 makes an INVITE request 613, which is the same request as the INVITE request 67, again via the SIP server 213. However, in this instance, since the port number of the controlling port of the device 31 has been changed, the SIP server 213 makes an INVITE request 614 to the device 31 with the port number "5011" which is the changed number. Notifications 615 and 616 represent "200 OK" which denotes that the connection is established. The notification 615 is sent from the device 31 to the SIP server 213 and the notification 616 is sent from the SIP server 213 to the device 21, and thereafter data transferring of the IP-FAX is performed between the device 21 and the device 31.

It should be noted that in the embodiment, the port number of the controlling port of the device 31, the number being registered on the SIP server 213, is changed to defend against a DoS attack, but the port number to be changed is not limited to this, and the port number of the data port or the RTP port of the device 31 may also be changed. In addition, the number of packets of a DoS attack is not limited to the shown example, but any number is possible.

As a way to detect a DoS attack in the device 31, packet load may be used as well as an error of packet information (malformed packet) may also be used for determination. In addition, the similar control can be applied to not only a DoS attack but also a DDoS attack from a plurality of terminals. It should be noted that the IP address of the PC 29, which is identified by the device 31, is not limited and may be an IPv4 address as well as an IPv6 address. Furthermore, a waiting time denoted by reference numeral 611 in FIG. 6 is not necessarily 60 seconds and may also be changed by the user into any time.

An example of an operation of the device 31 performed when the device 31 recognizes a DoS attack is now described with reference to FIG. 7.

Figure 7:
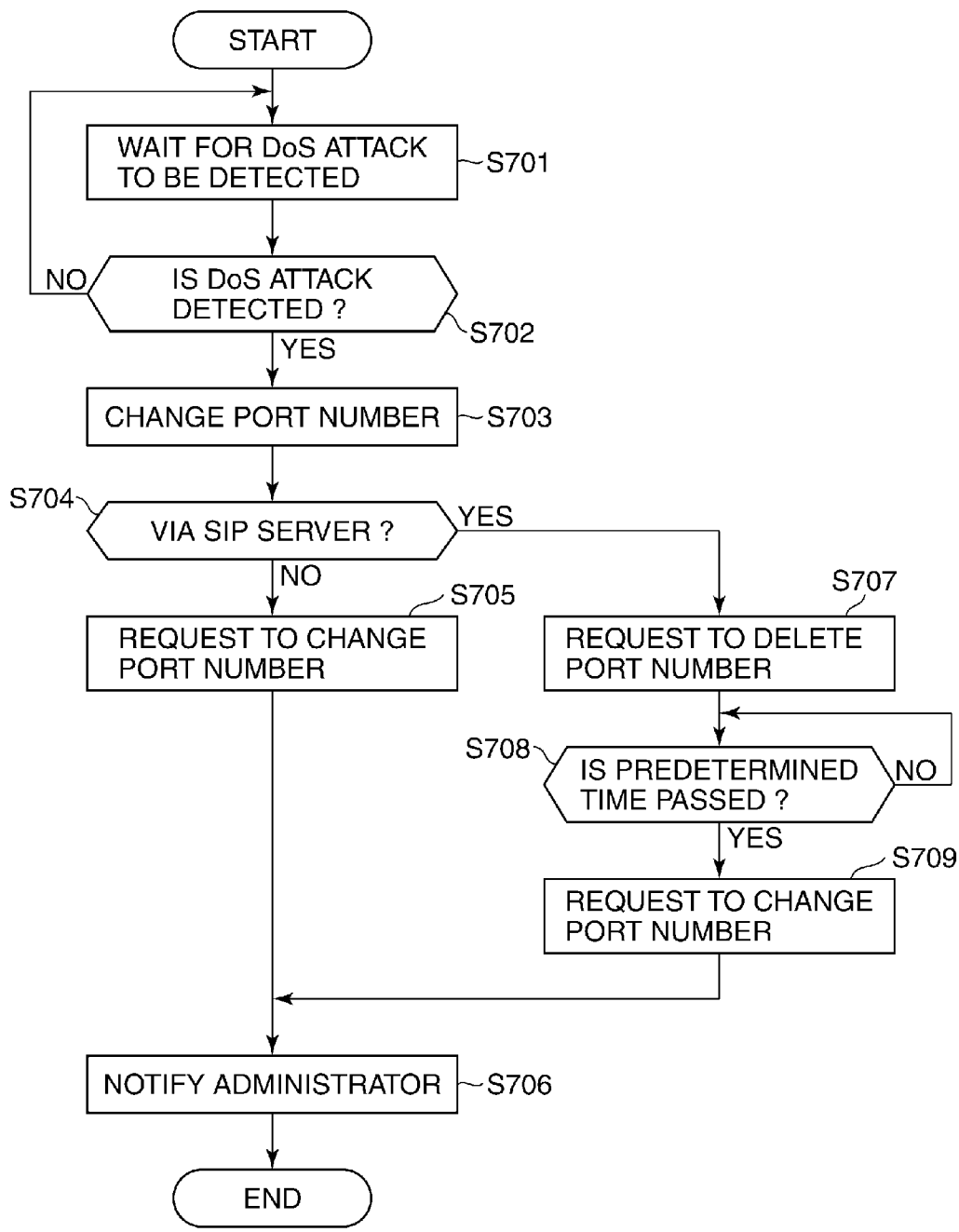
FIG. 7 is a flow chart showing a procedure of operational processing carried out when the device is subjected to a DoS attack.

FIG. 7 is a flow chart showing a procedure of operational processing carried out when the device 31 recognizes a DoS attack.

In step S701, the CPU 11 waits for unauthorized communication such as a DoS attack to be detected. Next, in step S702, the CPU 11 determines whether or not the unauthorized communication is detected. The processing of steps S701 and S702 is an example of an operation of the claimed detecting unit. As a result of the determination, if the unauthorized communication is not detected, the flow of the processing returns to step S701; on the other hand, if the unauthorized communication is detected, the flow of the processing proceeds to step S703.

In step S703, the CPU 11 refers to the table shown in FIG. 4 to change a port number of the controlling port of the device 31. The processing of step S703 is an example of an operation of the claimed changing unit. In step S704, the CPU 11 determines whether or not the unauthorized communication has passed through the SIP server 213. The processing of step S704 is an example of an operation of the claimed determining unit. As a result of the determination, if the unauthorized communication has passed through the SIP server 213, the flow of the processing proceeds to step S707; otherwise, the flow of the processing proceeds to step S705.

In step S705, the CPU 11 makes a REGISTER request 510 to the SIP server 213 in order to change a setting value registered as the port number of the controlling port of the device 31. The processing of step S705 is an example of an operation of the claimed controlling unit. Thereafter, in step S706, the CPU 11 notifies by e-mail an administrator that the device 31 recognizes the DoS attack. The processing of step S706 is an example of an operation of the claimed notifying unit.

In step S707, the CPU 11 makes a request to the SIP server 213 to delete a setting value registered as the port number of the controlling port of the device 31. The processing of step S707 is an example of the operation of the claimed controlling unit.

In step S708, the CPU 11 determines whether or not a predetermined time (e.g., 60 seconds) has passed, and after the predetermined time has passed, the flow of the processing proceeds to step S709. This processing corresponds to the timer counting 611 shown in FIG. 6. The processing of step S708 is an example of the operation of the claimed controlling unit.

In step S709, the CPU 11 makes a REGISTER request 612 to the SIP server 213 to change the setting value registered as the port number of the controlling port of the device 31, and the flow of the processing proceeds to step S706. The processing of step S709 is an example of the operation of the claimed controlling unit.

It should be noted that the device 31 at which IP-FAX is to be received may request the SIP server 213 to stop the transmission to the receiving port thereof from the SIP terminal (here, the SIP server 213), which is performing the DoS attack. Also, as a way to disable unauthorized communication, communication from a device (here, the PC 29) that performs unauthorized communication may be filtered. Also, in step S707, the device 31 at which IP-FAX is to be received may delete the port number of the controlling port of the device 31 before making the deleting request 610. In addition, in step S708, the waiting time is not limited to 60 seconds, any value is possible. The waiting time may also be changed by the user and the administrator. In this case, the change of the setting and the like is performed with an operating portion (operating unit), not shown. Furthermore, if unauthorized communication is detected again after the receiving port is changed, the receiving port may be disabled before notifying the user or the administrator (by a notifying unit).

According to the above described embodiment, if the device 31 that performs IP-FAX communication detects unauthorized communication, the device 31 changes a port number of a receiving port, and determines whether or not the detected unauthorized communication has passed through the SIP server 213 on a network. If the unauthorized communication is determined to have passed through the SIP server 213, the device 31 requests the SIP server 213 to disable the unauthorized communication. As a result, the device 31 that uses the IP-FAX communication can block a DoS attack and a DDoS attack reliably. In addition, after the above described request, at the time when the predetermined time has passed, the device 31 re-registers the port number of the changed receiving port on the SIP server 213. As a result, even after the device 31 recognizes the above described attack, the device 31 can perform the IP-FAX communication without making the user aware of the attack and without any difficulty. On the other hand, if the unauthorized communication is determined to have bypassed the SIP server 213, the device 31 re-registers the port number of the changed receiving port on the SIP server 213. As a result, even after the device 31 recognizes a DoS attack or a DDoS attack, the device 31 that uses the IP-FAX communication can perform the IP-FAX communication without making the user aware of the attack and without any difficulty.

It is to be understood that the present invention may also be realized by supplying a system or an apparatus with a storage medium in which a program code of software which realizes the functions of the above described embodiment is stored, and causing a computer (or CPU or MPU) of the system or apparatus to read out and execute the program code stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2010-151991, filed Jul. 2, 2010, which is hereby incorporated by reference herein in its entirety.

What is claimed is:

1. A communicating apparatus comprising:
    at least one hardware processor connected to at least one memory;
    a communicating unit configured to perform communication that uses a SIP server on a network;
    a detecting unit configured to detect unauthorized communication from the communication performed by said communicating unit;
    a changing unit configured to change a port number of a receiving port of said communicating unit when said detecting unit detects the unauthorized communication;
    a determining unit configured to determine whether or not the unauthorized communication detected by said detecting unit has passed through the SIP server; and
    a controlling unit configured to request the SIP server to delete the port number of the receiving port that has not been changed yet by said changing unit if said determining unit determines that the unauthorized communication has passed through the SIP server and to re-register on the SIP server a port number of a receiving port that has been changed by said changing unit if said determining unit determines that the unauthorized communication has bypassed the SIP server;
    wherein the detecting unit, the changing unit, the determining unit, and the controlling unit are implemented, at least in part, by the at least one hardware processor and the at least one memory.

2. The communicating apparatus according to claim 1, wherein said controlling unit further requests the SIP server to filter communication from a device performing the unauthorized communication.

3. The communicating apparatus according to claim 1, wherein if said controlling unit requests the SIP server to delete the port number of the receiving port that has not been changed yet by said changing unit, said controlling unit re-registers, after a predetermined time set has passed, the port number of the receiving port that has been changed by said changing unit on the SIP server.

4. The communicating apparatus according to claim 3, further comprising an operating unit configured to allow a user or an administrator to change a setting of the predetermined time.

5. The communicating apparatus according to claim 1, further comprising a notifying unit configured to notify a user or an administrator if said detecting unit detects unauthorized communication.

6. The communicating apparatus according to claim 5, wherein if said detecting unit detects unauthorized communication again after said changing unit changes the port number of the receiving port, said notifying unit disables the receiving port before notifying the user or the administrator.

7. The communicating apparatus according to claim 1, wherein said changing unit changes the port number of the receiving port by referring to pre-stored table information.

8. A controlling method for a communicating apparatus including a communicating unit configured to perform communication that uses a SIP server on a network, the method comprising:
    a detecting step of detecting unauthorized communication from the communication performed by said communicating unit;
    a changing step of changing a port number of a receiving port of said communicating unit when the unauthorized communication is detected in said detecting step;
    a determining step of determining whether or not the unauthorized communication detected in said detecting step has passed through the SIP server; and
    a controlling step of requesting the SIP server to delete the port number of the receiving port that has not been changed yet in said changing step if it is determined in said determining step that the unauthorized communication has passed through the SIP server, and re-registering on the SIP server a port number of a receiving port that has been changed in said changing step, if it is determined in said determining step that the unauthorized communication has bypassed the SIP server;

wherein the detecting step, the changing step, the determining step, and the controlling step are implemented, at least in part, by a hardware processor.

9. A non-transitory computer-readable storage medium storing a program that, when executed by a computer, causes the computer to perform a controlling method for a communicating apparatus including a communicating unit configured to perform communication that uses a SIP server on a network, the method comprising:

a detecting step of detecting unauthorized communication from the communication performed by said communicating unit;

a changing step of changing a port number of a receiving port of said communicating unit when the unauthorized communication is detected in said detecting step;

a determining step of determining whether or not the unauthorized communication detected in said detecting step has passed through the SIP server; and a controlling step of requesting the SIP server to delete the port number of the receiving port that has not been changed yet in said changing step if it is determined in said determining step that the unauthorized communication has passed through the SIP server, and re-registering on the SIP server a port number of a receiving port that has been changed in said changing step, if it is determined in said determining step that the unauthorized communication has bypassed the SIP server.

* * * * *